United States Patent
Goto et al.

(10) Patent No.: US 6,417,480 B2
(45) Date of Patent: Jul. 9, 2002

(54) METHOD OF PROCESSING A SURFACE OF A MOLD USING ELECTRIC DISCHARGE, AN ELECTRODE USED IN SUCH PROCESSING AND A METHOD OF MANUFACTURING SUCH AN ELECTRODE

(75) Inventors: Akihiro Goto; Toshio Moro, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/822,034

(22) Filed: Mar. 30, 2001

Related U.S. Application Data

(63) Continuation of application No. PCT/JP98/05110, filed on Nov. 13, 1998.

(51) Int. Cl.$^7$ .......................... B23K 15/00; B23K 35/22

(52) U.S. Cl. ..................................... 219/121.27; 419/66

(58) Field of Search ........................ 419/66; 219/121.27

(56) References Cited

U.S. PATENT DOCUMENTS

| | | | | |
|---|---|---|---|---|
| 5,651,901 A | * | 7/1997 | Mohri et al. | 219/69.17 |
| 5,858,479 A | * | 1/1999 | Saito et al. | 427/580 |
| 6,086,684 A | * | 7/2000 | Saito et al. | 148/220 |

FOREIGN PATENT DOCUMENTS

| | | |
|---|---|---|
| JP | 48-44555 | 12/1973 |
| JP | SHO 62-15024 | 1/1987 |
| JP | 112738 | 5/1987 |
| JP | HEI 8-257841 | 10/1996 |
| JP | 8-300227 | 11/1996 |
| JP | HEI 9-19829 | 1/1997 |
| JP | HEI 9-192937 | 7/1997 |

\* cited by examiner

*Primary Examiner*—Daniel J. Jenkins
(74) *Attorney, Agent, or Firm*—Sughrue Mion, PLLC

(57) ABSTRACT

The electrode used in processing a surface of a mold is manufactured as follows. Material powder such as metal powder or metal compound powder is filled in a female mold of the mold. Then the material powder in the female mold is press-molded using a male mold. The surface of the mold is then treated using this electrode.

9 Claims, 2 Drawing Sheets

(a)

(b)

(a)

(b)

(c)

(d)

(a)

(b)

METHOD OF PROCESSING A SURFACE OF A MOLD USING ELECTRIC DISCHARGE, AN ELECTRODE USED IN SUCH PROCESSING AND A METHOD OF MANUFACTURING SUCH AN ELECTRODE

This application is continuation application of PCT patent application PCT/JP98/05110, filed Nov. 13, 1998, which was published in Japanese.

TECHNICAL FIELD

The present invention in general relates to a method of processing a surface of a mold using electric discharge, an electrode used in such processing and a method of manufacturing such an electrode. More specifically, this invention relates to a technology of processing a surface of a mold using a formed electrode.

BACKGROUND ART

In molds for forging process, molds for bending process and molds for drawing process, surfaces of these molds must have excellent abrasion resistance properties, in order to achieve a desired perseverance properties. Conventionally, heat processing is mainly performed as the surface processing for imparting abrasion resistance properties to molds. In addition, in some cases, a hard film is coated on the mold surface by the nitriding treatment or the carburizing treatment of the mold surface, or by deposition plating such as CVD (Chemical Vapor Deposition), PVD (Physical Vapor Deposition) and the like.

However, when the mold surface is treated by the heat processing, the precision of the mold configuration inevitably deteriorates due to shape-change resulted from heating, and cracks tend to be generated in the mold depending on the shape of the mold. As a result, a significant number of failures may be produced in the mold producing process.

On the other hand, in the case of the hard-film coating by thermal refining such as nitriding and carburizing treatments or the deposition plating, various problems, such as too high processing cost, restriction on the size of materials to be processed or the like, arise. Due to this, the hard-film coating is hardly performed for press molds or the like.

As another method of coating a hard film on the mold surface, there has been proposed a discharge surface processing method which includes the steps of: generating pulse-like discharge between an electrode and a work (mold) in a processing liquid such as a discharge processing oil; and forming on the mold surface, by the discharge energy, a hard film composed of the electrode material or a substance like a metal carbide generated by the reaction of the electrode material due to the discharge energy. A discharge surface processing method of this type is disclosed in Japanese Patent Office Application Laid-Open gazettes (JP-A No. 9-19829 and JP-A No. 9-192937).

As is disclosed in Japanese Patent Office Application Laid-Open gazettes (JP-A No. 8-257841), the discharge surface processing can be carried out either by using a simple-shaped electrode having a rod-like shape or by using a formed electrode. When the mold surface is discharge-surface processed by a simple-shaped electrode having a rod-like shape, the discharge surface processing is carried out by the electrode scanning along the mold surface. However, this process is quite time-consuming and not capable of coping with a three-dimensional complicated mold surface. In short, it is difficult to carry out highly precise discharge surface processing by a simple-shaped electrode having a rod-like shape.

On the other hand, in a case in which the mold surface is discharge-surface processed by a formed electrode, it is necessary to prepare an electrode for each mold such that the shape of the electrode corresponds to the corresponding mold, although the aforementioned problems that occur in the case of the simple-shaped electrode having a rod-like shape are avoided.

Conventionally, a formed electrode is produced: by filling metal powder such as Ti, $TiH_2$ in a die for producing a formed electrode; and pressing and compressing the metal powder in the die by a punch, so as to pressure-mold a formed electrode by utilizing solidification of the metal powder resulted from the pressing. A formed electrode produced in such a manner is called a "formed pressed powder electrode".

When a formed pressed powder electrode is produced in such a manner, a die for producing the formed electrode and a punch are required, thereby increasing the production cost. In addition, the precision in producing the die for the formed electrode production and the precision in producing the punch, directly influence the precision in the discharge surface processing of the die surface. Accordingly, unless the punch and the die for producing the formed electrode are produced in a highly precise manner, the discharge surface processing cannot be conducted as precisely as desired.

In particular, when the mold is produced in a relatively small scale, the number of required electrode is not large. In other words, the production cost of the electrode significantly affects the production cost of the mold as a whole, thereby preventing the discharge surface processing from being more widely performed.

The present invention has been contrived in order to solve the problems as described above. It is an object of the present invention to provide a method of processing a surface of a mold using electric discharge which is highly accurate, efficiently and low-cost. It is also an object of the present invention to provide an electrode used in such processing and a method of manufacturing such an electrode.

DISCLOSURE OF THE INVENTION

The method of processing a surface of a mold using electric discharge of the present invention comprises the following steps. That is, preparing a compressed powder formed electrode, and carrying out discharge surface processing of mold surface of the mold by using the compressed powder formed electrode. The compressed powder formed electrode is produced by the following method. That is, filling material powder such as metal powder or metal compound powder in a female mold of the mold to be discharge surface processed, and press-molding the material powder in the female mold by a male mold of the mold.

Thus, the surface of the mold is treated using the compressed powder formed electrode. This electrode is molded by the mold to be discharge—surface processed without using a die and a punch for producing the formed electrode, such that the formed electrode very precisely corresponds, in shape, to the mold surface. As the formed electrode very precisely corresponds, in shape, to the mold surface, the discharge surface processing can be carried out efficiently and very precisely on the mold surface.

Further, the method of processing a surface of a mold using electric discharge of the present invention comprises the following steps. That is, attaching the compressed powder formed electrode to one of the male mold and the female mold with a conductive adhesive, and carrying out the discharge surface processing of the other of the male mold and the female mold, by using the one of the male mold and the female mold itself as an electrode holder.

Accordingly, the compressed powder formed electrode, formed by the mold to be discharge surface processed, is attached to one of the male mold and the female mold by the conductive adhesive, and the discharge surface processing of the other of the male mold and the female mold is carried out by using the one of the male mold and the female mold itself as an electrode holder.

Further, the method of manufacturing an electrode, which electrode is used in processing a surface of a mold, of the present invention comprises following steps. That is, filling material powder such as metal powder, metal compound powder or the like in the female mold of a mold to be discharge surface processed, and press-molding the material powder in the female mold by the male mold of the mold, thereby producing a compressed powder formed electrode.

Accordingly, a compressed powder formed electrode, which very precisely corresponds, in shape, to the mold surface, can be obtained without using a die and a punch for producing the formed electrode.

Further, an electrode, which electrode is used in processing a surface of a mold, of the present invention is formed as follows. That is, attaching the compressed powder formed electrode to one of the male mold and the female mold with a conductive adhesive, and using the one of the male mold and the female mold itself as an electrode holder.

Accordingly, formed electrode formed by the mold to be discharge surface processed, is attached to one of the male mold and the female mold to be discharge surface processed by the conductive adhesive, and the one of the male mold and the female mold itself is used as an electrode holder.

Further, an electrode, which electrode is used in processing a surface of a mold, of the present invention is formed as follows. That is, filling material powder such as metal powder, metal compound powder or the like in the female mold of a mold to be discharge surface processed; and press-molding the material powder in the female mold by the male mold of the mold.

Accordingly, a formed electrode for mold discharge surface processing which very precisely corresponds, in shape, to the mold surface can be produced without using a die and a punch for producing the formed electrode, enabling highly precise mold discharge surface processing.

Further, an electrode, which electrode is used in processing a surface of a mold, of the present invention is formed as follows. That is, the electrode for processing mold discharge surface is attached to one of the male mold and the female mold with a conductive adhesive, and the one of the male mold and the female mold itself is used as an electrode holder.

Accordingly, this formed electrode for mold discharge surface processing is attached, with a conductive adhesive, to one of the male mold and the female mold to be discharge surface processed, and the one of the male mold and the female mold itself is used as an electrode holder.

BEST MODE FOR CARRYING OUT THE INVENTION

A preferred embodiment of the present invention will be described hereinafter with reference to the accompanying drawings.

First, with reference to FIG. 1(a) to FIG. 1(d), a method of producing an electrode for mold discharge surface processing according to the present invention will be described. In FIG. 1(a) to FIG. 1(d), legend 10 represents the female mold of a mold to be discharge surface processed, and legend 20 represents the male mold of the mold to be discharge surface processed, respectively.

Figure 1:
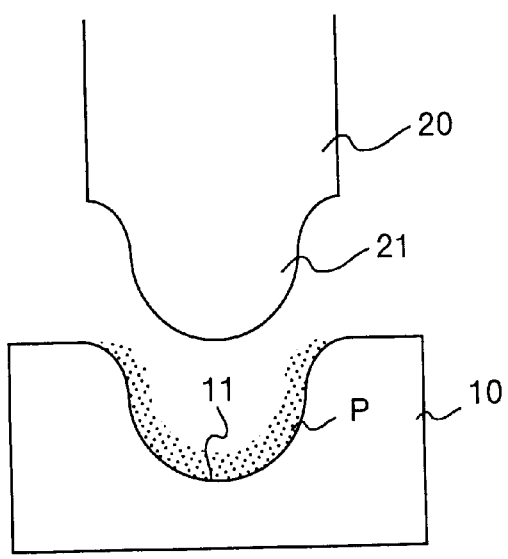
FIG. 1(a) to FIG. 1(d) are explanatory views showing implementing steps of a method of producing an electrode for mold discharge surface processing of the present invention.
Figure 1:
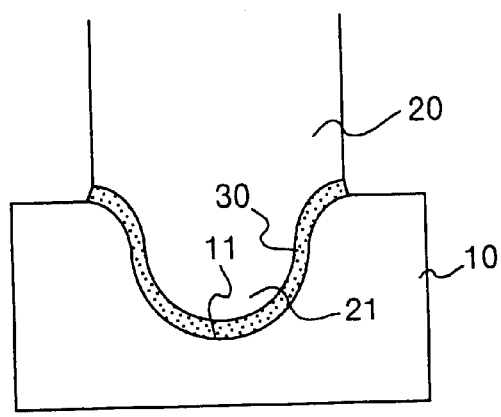
Figure 1:
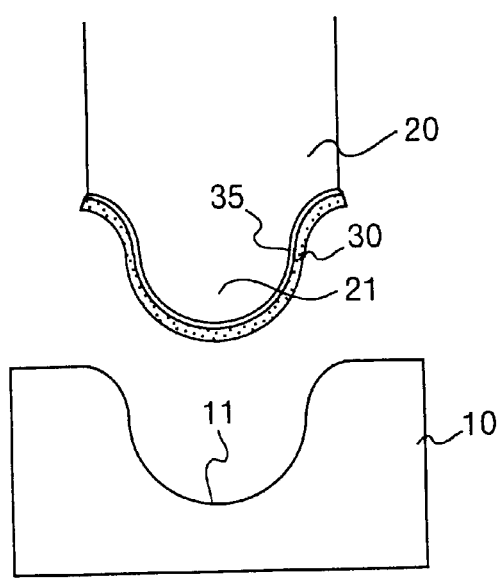
Figure 1:
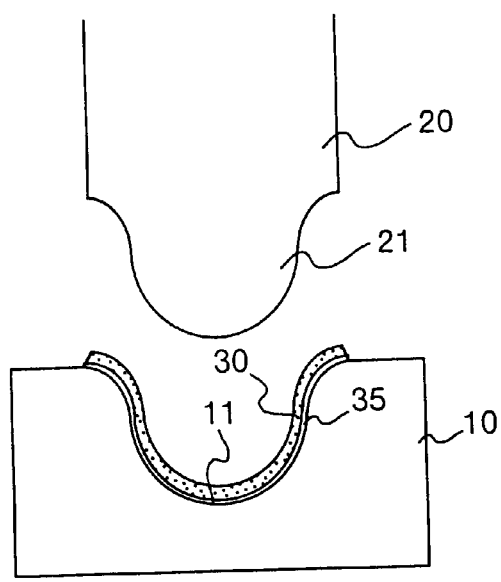

As shown in FIG. 1(a), a predetermined amount of material powder P, which may include metal powder such as Ti, metal compound powder such as $TiH_2$ and the like, is filled in the female mold 10 to be discharge surface processed.

As shown in FIG. 1(b), the material powder P in the female mold 10 is press-molded by the male mold 20 to be discharge surface processed, thereby producing a compressed powder formed electrode 30.

When a compressed powder formed electrode 30 which performs discharge surface processing with respect to a mold surface 11 of the female mold 10 is produced, the compressed powder formed electrode 30 is attached to a mold surface 21 of the male mold 20 by applying a conductive adhesive in advance on the mold surface 21 of the male mold 20, and as shown in FIG. 1(c), the compressed powder formed electrode 30 is released from the female mold, when the male and female molds are separated, in a state in which the compressed powder formed electrode 30 is attached to the mold surface 21 of the male mold 20 with the conductive adhesive 35.

When a compressed powder formed electrode 30 which performs discharge surface processing with respect to the mold surface 21 of the male mold 20 is produced, the compressed powder formed electrode 30 is attached to the mold surface 11 of the female mold 10 by applying a conductive adhesive in advance on the mold surface 11 of the female mold 10, and as shown in FIG. 1(d), the compressed powder formed electrode 30 is released from the male mold, when the male and female molds are separated, in a state in which the compressed powder formed electrode 30 is attached to the mold surface 11 of the female mold 10 with the conductive adhesive 35.

Accordingly, the compressed powder formed electrode 30 which very precisely corresponds, in shape, to the mold surface can be produced without using a die and a punch for producing the formed electrode.

Specifically, as shown in FIG. 1(c), the compressed powder formed electrode 30 which performs discharge surface processing with respect to a mold surface 11 of the female mold 10 is almost perfectly complementary, in shape, to the mold surface 11 of the female mold 10 and thus very precisely corresponds, in shape, to the mold surface 11 of the female mold 10. Similarly, as shown in FIG. 1(d), the compressed powder formed electrode 30 which performs discharge surface processing with respect to a mold surface 21 of the male mold 20 is almost perfectly complementary, in shape, to the mold surface 21 of the male mold 20 and thus very precisely corresponds, in shape, to the mold surface 21 of the male mold 20.

When the discharge surface processing is carried out with respect to the mold surface 11 of the female mold 10, by attaching the compressed powder formed electrode 30 to the female mold 10 or the male mold 20 with a conductive adhesive, the male mold 20 itself can be used as an electrode holder which serves in a manner similar to an electrode mounting shank. When the discharge surface processing is carried out with respect to the mold surface 21 of the male mold 20, by attaching the compressed powder formed electrode 30 to the female mold 10 or the male mold 20 with a conductive adhesive, the female mold 10 itself can be used as an electrode holder which serves in a manner similar to an electrode mounting shank.

The compressed powder formed electrode 30 may be attached to the female mold 10 or the male mold 20 with the conductive adhesive after releasing the compressed powder formed electrode 30 from the mold, by applying the conductive adhesive to the mold surface 11 of the female mold 10 or the mold surface 21 of the male mold 20 from which the compressed powder formed electrode 30 has been removed.

A method of processing a surface of a mold using electric discharge according to the present invention will be explained referring to FIG. 2(a) and FIG. 2(b).

Figure 2:
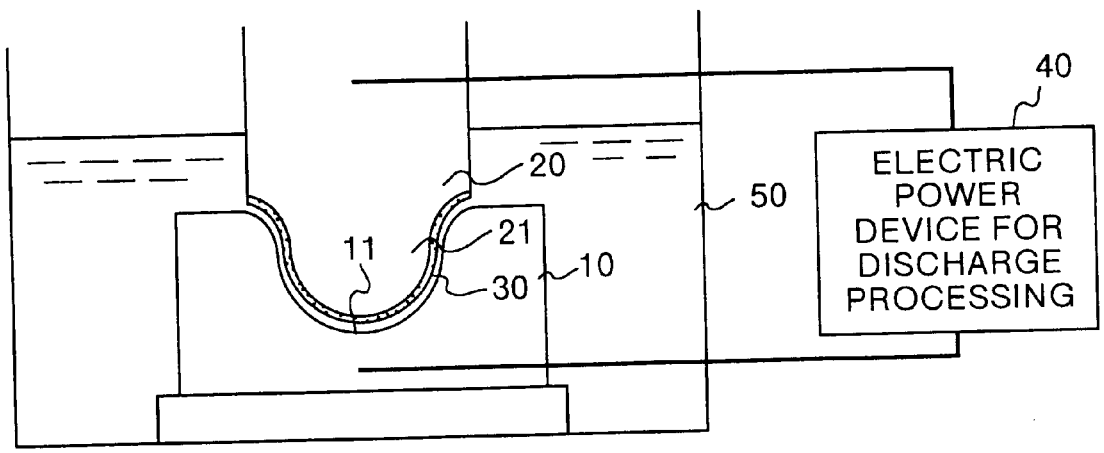
FIG. 2(a) and FIG. 2(b) are explanatory views showing implementing steps of a method of processing a surface of a mold using electric discharge of the present invention.
Figure 2:
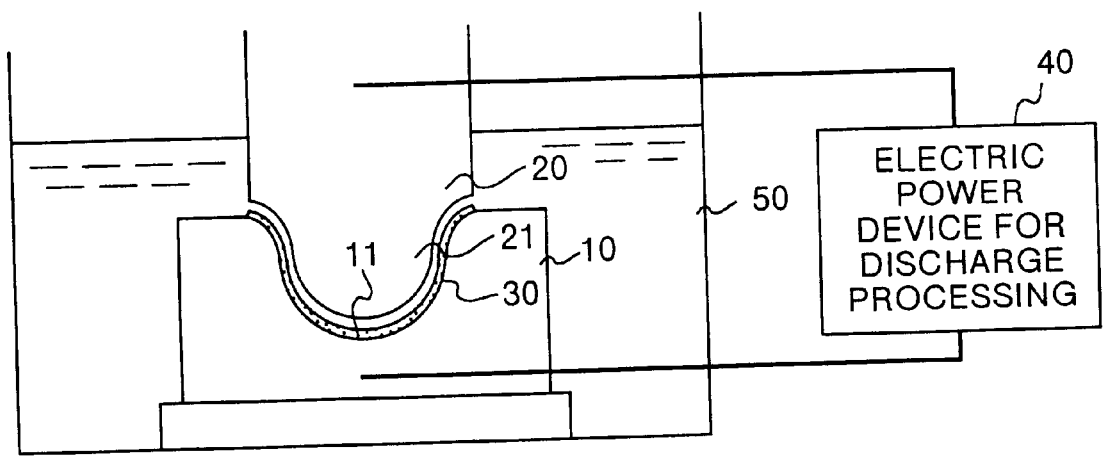

When the discharge surface processing is carried out on the mold surface 11 of the female mold 10, as shown in FIG. 2(a), an electric power device for discharge processing 40 is connected to the female mold 10 as the work and the male mold 20. The male mold 20 is produced in the aforementioned manner, has the compressed powder formed electrode 30 attached thereon and is used as the electrode holder. Discharge voltage is pulse-applied between the compressed powder formed electrode 30 and the female mold 10, in a processing liquid such as an oil in a processing tank 50, in a state in which a predetermined discharge gap is provided between the compressed powder formed electrode 30 and the mold surface 11 of the female mold 10.

As a result, pulse-like discharge is generated between the compressed powder formed electrode 30 and the female mold 10, and the electrode material is deposited on the mold surface 11 of the female mold 10 due to the discharge energy or the substance like a metal carbide, which is produced by the reaction of the electrode material due to the discharge energy, is deposited on the mold surface 11 of the female mold 10, thereby evenly forming a hard film allover the mold surface 11 of the female mold 10. Accordingly, the discharge surface processing with respect to the molding surface 11 of the female mold 10 can be carried out efficiently and very precisely.

When the discharge surface processing is carried out on the mold surface 21 of the male mold 20, as shown in FIG. 2(b), an electric power device for discharge processing 40 is connected to the male mold 20 as the work and the female mold 10. The female mold 10 is produced in the aforementioned manner, has the compressed powder formed electrode 30 attached thereon and is used as the electrode holder. Discharge voltage is pulse-applied between the compressed powder formed electrode 30 and the male mold 20, in a processing liquid such as an oil in a processing tank 50, in a state in which a predetermined discharge gap is provided between the compressed powder formed electrode 30 and the mold surface 21 of the male mold 10.

As a result, pulse-like discharge is generated between the compressed powder formed electrode 30 and the male mold 20, and the electrode material is deposited on the mold surface 21 of the male mold 20 due to the discharge energy or the substance like a metal carbide, which is produced by the reaction of the electrode material due to the discharge energy, is deposited on the mold surface 21 of the male mold 20, thereby evenly forming a hard film allover the mold surface 21 of the male mold 20. Accordingly, the discharge surface processing with respect to the mold surface 21 of the female mold 20 can be carried out efficiently and very precisely.

Industrial Applicability

As described above, the method of processing a surface of a mold using electric discharge of the present invention can be utilized as a method of surface processing, in which excellent abrasion resistance properties are imparted to the mold surface of a mold such as a mold for forging process, a mold for bending process and a mold for drawing process. In addition, the method of producing electrode for mold discharge surface processing of the present invention can be utilized in producing a formed compressed-powder electrode used for the discharge surface processing of a mold. Further, the electrode for mold discharge surface processing of the present invention can be used in the method of processing a surface of a mold using electric discharge.

What is claimed is:

1. A method of processing a surface of a mold using electric discharge comprising the steps of:

preparing a compressed powder formed electrode; and treating a surface of the mold using the compressed powder formed electrode, wherein the compressed powder formed electrode is produced by filling a material powder in a female mold of the mold, and press-molding the material powder in the female mold by a male mold of the mold.

2. The method of processing a surface of a mold using electric discharge according to claim 1 further comprising the steps of:

attaching the compressed powder formed electrode to either a male mold or a female mold using a conductive adhesive; and treating a surface of the female mold when the electrode is attached to the male mold, or treating a surface of the male mold when the electrode is attached to the female mold.

3. A method of manufacturing an electrode, which electrode is used in processing a surface of a mold, the method comprising the steps of:

filling a material powder in a female mold of the mold; and press-molding the material powder in the female mold by a male mold of the mold, thereby producing a compressed powder formed electrode.

4. The method of manufacturing an electrode according to claim 3 further comprising the steps of:

attaching the compressed powder formed electrode to either a male mold or a female mold using a conductive adhesive; and treating a surface of the female mold when the electrode is attached to the male mold, or treating a surface of the male mold when the electrode is attached to the female mold.

5. An electrode, which electrode is used in processing a surface of a mold, formed by the method comprising the steps of:

filling a material powder in a female mold of the mold; and press-molding the material powder in the female mold by a male mold of the mold.

6. The electrode according to claim 5, wherein the electrode is used by attaching it to either a male mold or a female mold using a conductive adhesive.

7. A method of processing a surface of a mold using electric discharge comprising the steps of:

preparing a compressed powder formed electrode; and treating a surface of the mold using the compressed powder formed electrode, wherein the compressed powder formed electrode is produced by press-molding a material powder on the surface of the mold.

8. A method of manufacturing an electrode, which electrode is used in processing a surface of a mold, the method comprising the steps of:

press-molding the material powder on the surface of the mold, thereby producing a compressed powder formed electrode on the surface of the mold.

9. An electrode, which electrode is used in processing a surface of a mold, formed by the method comprising the steps of:

press molding a material powder onto a surface of the mold.

* * * * *